(No Model.)
2 Sheets—Sheet 2.
J. EISENHART.
VELOCIPEDE.
No. 462,115. Patented Oct. 27, 1891.
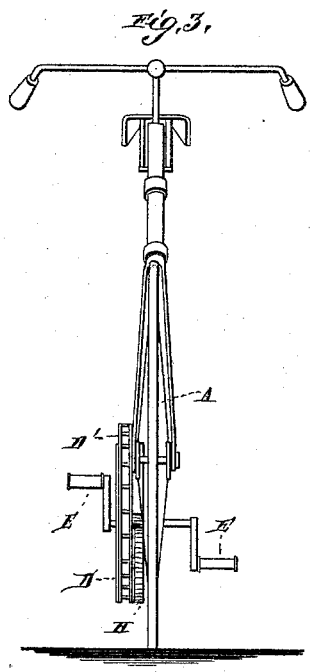
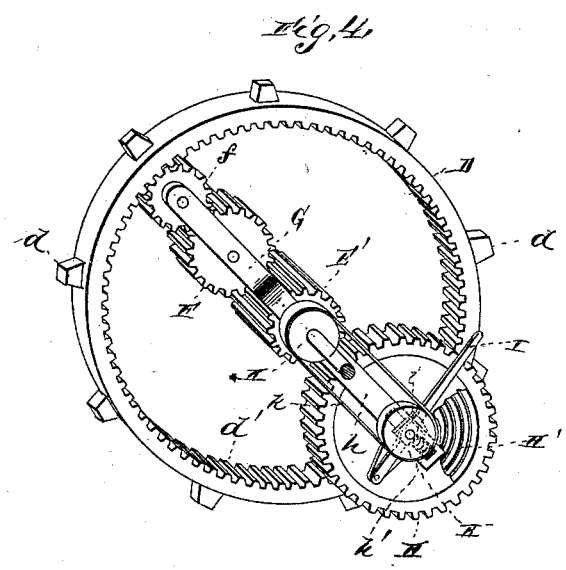
WITNESSES:
Chas. L. Taylor
Phil C. Masi
INVENTOR
J. Eisenhart
BY E. W. Anderson
his ATTORNEY.

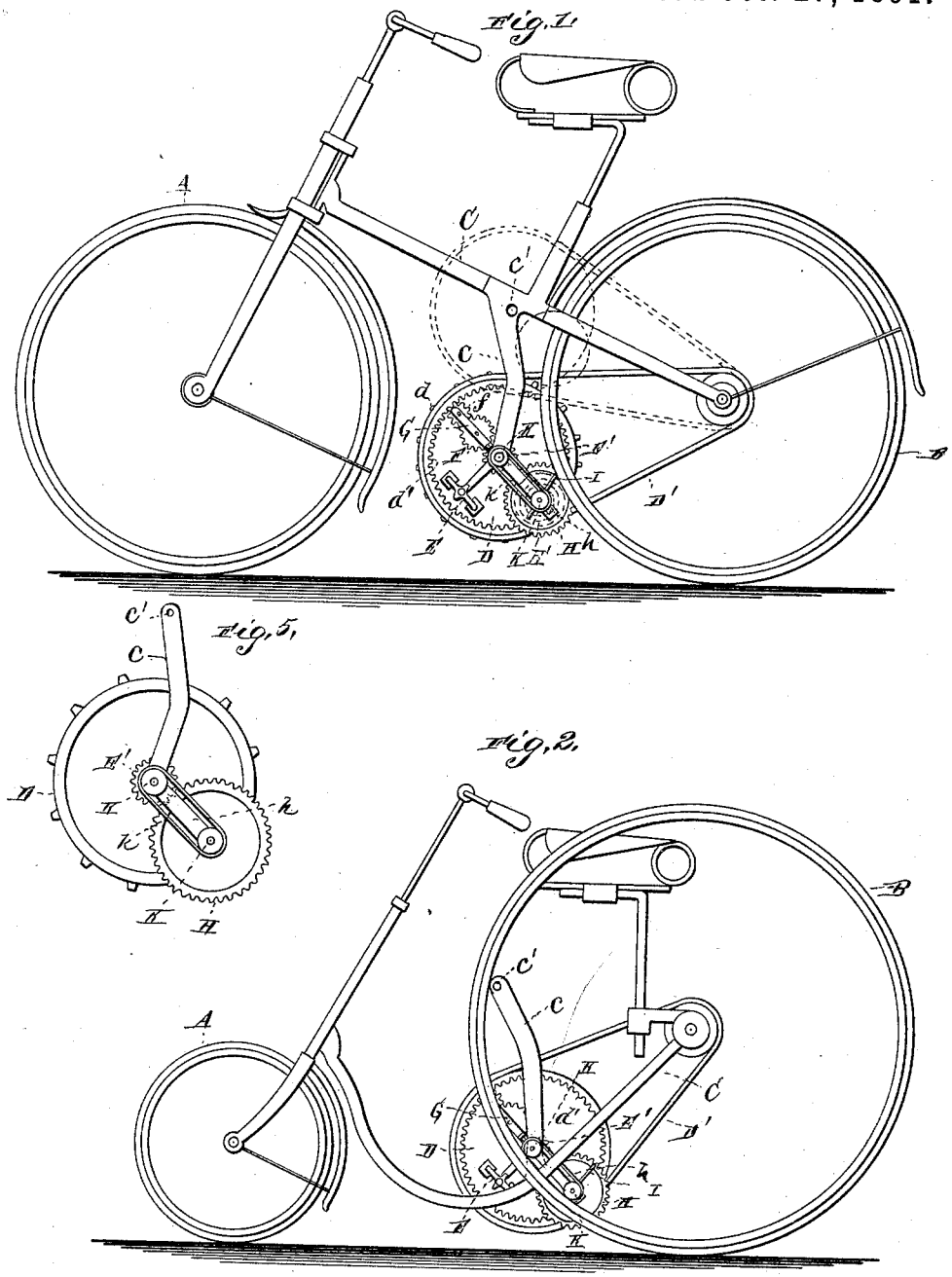

UNITED STATES PATENT OFFICE.

JEREMIAH EISENHART, OF BETHLEHEM, PENNSYLVANIA.

VELOCIPEDE.

SPECIFICATION forming part of Letters Patent No. 462,115, dated October 27, 1891.

Application filed March 26, 1891. Serial No. 386,488. (No model.)

*To all whom it may concern:*

Be it known that I, JEREMIAH EISENHART, a citizen of the United States, and a resident of Bethlehem, in the county of Northampton and State of Pennsylvania, have invented certain new and useful Improvements in Velocipedes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view. Fig. 2 is a side view modified. Fig. 3 is an end view. Fig. 4 is a perspective detail view showing the gearing, and Fig. 5 is a detail of the gearing modified.

This invention has relation to certain new and useful improvements in bicycles and tricycles; and it consists in the novel construction and combination of parts, as hereinafter described.

In the accompanying drawings, illustrating the invention, the letters A and B designate, respectively, the front and rear wheels of a bicycle of the kind commonly known as a "Safety," said wheels being preferably of about the same diameter. Adjustably bearing in a depending arm $c$ of the backbone or connecting-frame C of the machine between said wheels is an internally-flanged wheel D, having the exterior sprocket-teeth $d$ and the internal gear-teeth $d'$. A sprocket driving-chain D' runs over the wheel to a spur-wheel on the rear-wheel axle.

E E are the treadles designed to operate the central gear-wheel E', which turns the gear-wheels F $f$, hung on the arm G of the frame, the wheel $f$ running in the internal gear of the wheel D, by means of which said wheel D is turned and power given to the driving-chain.

H is a toothed or gear wheel having the internal coiled spring H' and bearing in a slotted arm $h$ of the frame. This wheel is adapted to mesh with the central gear-wheel E', but is normally held away from it. A spring $h'$ is arranged in the slot of the arm $h$ and bears against the axle of the wheel H. This spring is engaged by a lever I, and when the lever is depressed will be held away from engagement with the axle, a suitable catch $i$ being provided to hold the lever in this position and the wheel H out of engagement with the wheel E'. When the lever is released, the action of the spring will be exerted, throwing the said wheels in gear. A small sprocket-wheel K is arranged to be thrown into and out of engagement with the wheel E' and when in such engagement to be turned thereby, and around the sprocket-wheel extends a sprocket-chain $k$, which passes to and around a similar wheel K, connected to the spring H', which it is adapted to wind when said wheel is operated.

It will be seen that the parts may be thrown into gear to wind the spring, as described, and being then thrown out of gear the spring will remain wound until the lever I is released to throw the wheels H and E' into gear. The tension of the spring will then operate the wheel E' and through the gear-wheels F $f$ will drive the sprocket wheel and chain without the application of power to the treadles. The arm $c$ has a perforation $c'$ near its upper end, and this is adapted to serve as a bearing for the axle of wheel D, which wheel is adapted, with its connected gear described, to be shifted to this position in order to allow the treadles to be operated by the hands instead of by the feet, the position of the parts being indicated in dotted lines, Fig. 1.

In Fig. 2 I have shown my improvements applied to a tricycle, the parts being applied substantially the same as in the bicycle and designated, respectively, by the same letters. I have, however, shown the backbone or connecting-frame C as curved downwardly and the arm $c$ projecting upwardly therefrom instead of depending.

The operation of the parts is the same as that above described.

I may dispense with the gear-wheels F, as shown in Fig. 5, making the treadle-wheel E' fast to the wheel D, which it turns when the treadles are operated. This construction will dispense with the internal gear of the wheel D. This spring gear-wheel may be thrown into gear with the wheel E, as hereinbefore described, for the purpose of propelling the wheel D.

Having thus described my invention, what I claim as new, and desire to secure by Letters Patent, is—

1. The combination, with the connecting-frame, of the wheel D, carried thereby, said wheel having the exterior sprocket-teeth and the interior gear-teeth, said wheel being also vertically adjustable to bring the treadles into position to be operated either by the feet or hands, and the driving and propelling gear, substantially as specified.

2. The combination, with the connecting-frame, of the wheel D, carried thereby, said wheel having the exterior sprocket-teeth and the interior gear-teeth, the treadle-operated gear-wheel E', and the gear-wheels F $f$, operated thereby and operating said wheel D, and the spring gear-wheel H, driven by said wheel E', substantially as specified.

3. The combination, with the connecting-frame, of the gear and sprocket-wheel D, carried thereby, the treadle-actuated gear for operating said wheel, the driving-chain driven by the wheel D and operating a spur-wheel on the rear axle of the machine, and the spring-carrying gear-wheel H, driven by said treadle-actuated gear, substantially as specified.

4. The combination, with the wheel D, the treadle-actuated gear-wheel, and the intermediate gear for actuating said wheel D, of the wheel H, its spring H', means for winding said spring, and a spring for throwing said wheel H into and out of gear with the treadle-wheel E', substantially as specified.

5. The combination, with the wheel E', of the wheel H, bearing in a slotted arm of the frame, its spring H', the sprocket-gear for winding said spring, the spring $h'$ in the slot of said arm, and a lever for operating said spring $h'$ and throwing it into and out of engagement with the wheel H, substantially as and for the purpose specified.

6. The combination, with the connecting-frame and the arm $c$, carried thereby, of the actuating-gear adjustably hung on said arm and movable thereon in position to be operated by either the hands or the feet, substantially as specified.

7. The combination, with the connecting-frame and the arm $c$ thereof, of the adjustable gearing carried by said arm and movable thereon in positions to be actuated by either the hands or the feet, said gearing comprising the wheel D, the actuating-wheel E', and the internal gear F $f$, substantially as specified.

8. The combination, with the connecting-frame, the arm $c$ thereof, and the adjustable driving-gear carried thereby, of the gear-wheel H, adapted to engage said driving-gear, its spring H', the sprocket-gear for winding said spring H', the spring $h'$, and the lever for operating said spring, substantially as and for the purpose specified.

9. The combination, with the wheel D, of the treadle-operated gear-wheel for actuating said wheel D, and the sprocket spring-winding and spring mechanism and its shifting device, substantially as specified.

In testimony whereof I affix my signature in presence of two witnesses.

JEREMIAH EISENHART.

Witnesses:
T. T. BACHMAN,
ISRAEL WOODRING.